2,644,346

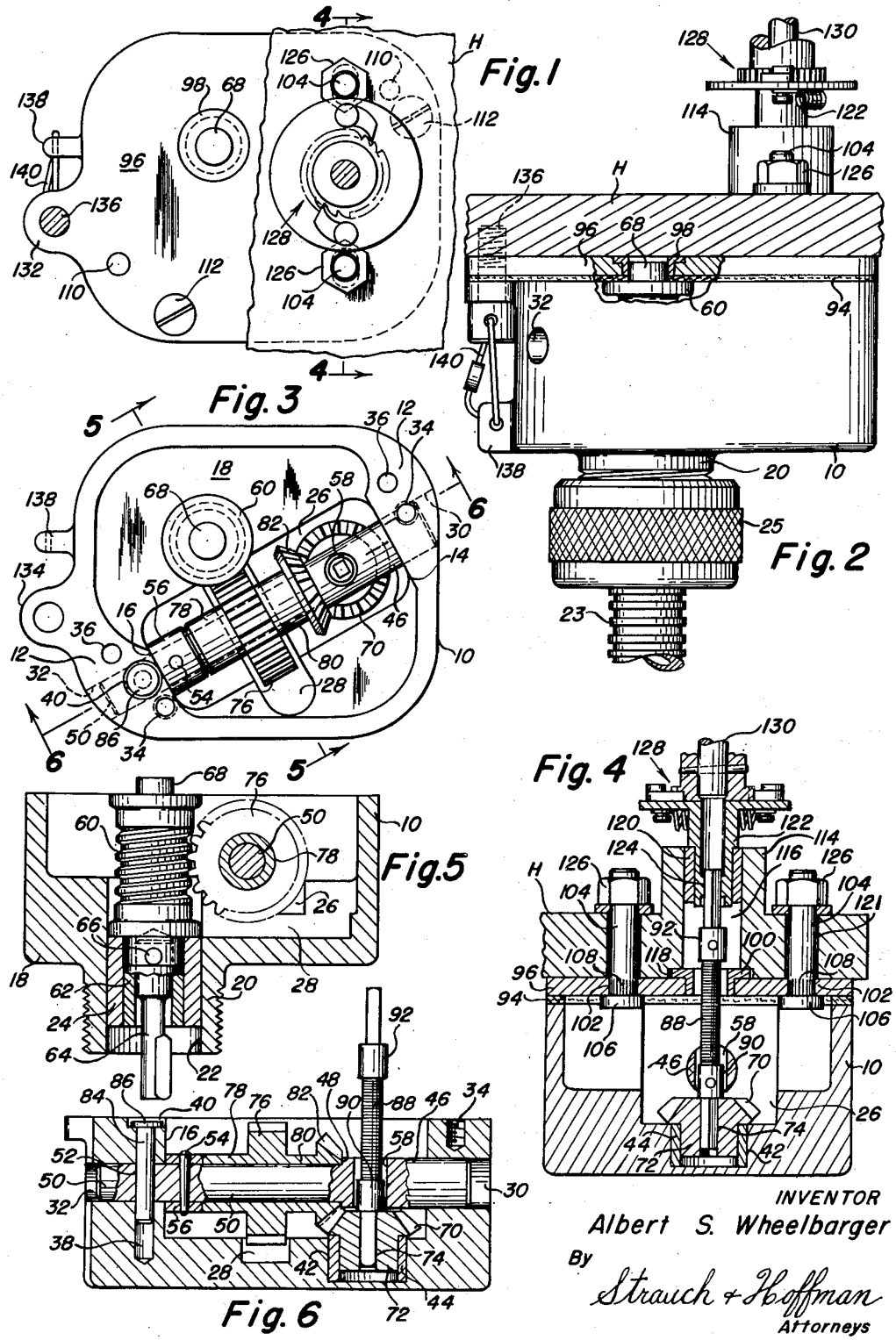
July 7, 1953   A. S. WHEELBARGER   2,644,346
REDUCTION GEAR UNIT
Filed Nov. 17, 1948
INVENTOR
Albert S. Wheelbarger
By Strauch & Hoffman
Attorneys Patented July 7, 1953

UNITED STATES PATENT OFFICE 2,644,346

REDUCTION GEAR UNIT

Albert S. Wheelbarger, Dayton, Ohio, assignor to Rockwell Register Corporation, Dayton, Ohio, a corporation of New York Application November 17, 1948, Serial No. 60,612

11 Claims. (Cl. 74—640)

This invention relates to reduction gear units and has for its general object and purpose to provide a reduction gear unit of novel design for meters, such as taximeters, speedometers, odometers and other registering devices.

With the evolution of design of motor vehicles, the need for smaller taximeters and other auxiliary equipment became apparent. It was the general practice to install the reduction gear box for the meter at the drive cable connection on the transmission or the rear end gear housing of the vehicle. However, the modern trend toward lower centers of gravity makes the installation of the gear box at this location very difficult, and in some cases impossible, without very radical and expensive changes in design. The enclosure of the reduction gearing within the meter housing is not feasible, since the gear lubricant would be thrown through the meter mechanism and one meter could not be interchanged with another without complication and expense, where a fleet of taxicabs of different makes would possibly require different reduction gear ratios due to relatively different final drive gear ratios of the vehicles.

It is therefore a prominent object of the present invention to overcome the above noted difficulties by the provision of a reduction gear box of minimum dimensions for direct attachment to the bottom wall of a meter housing and novel means for establishing a driving connection between the reduction gear and the drive shaft for the meter mechanism.

Another object of the invention resides in the provision of a novel mounting and arrangement of the reduction gearing within the gear box which obviates the necessity for close manufacturing clearances in the gear box construction while providing the requisite stability in the mounting of the cooperating gear elements in a box of minimum dimensions.

A more specific object of the invention is to provide a gear reduction embodying a vertically disposed worm journalled in the gear box for connection with the flexible drive shaft or cable, and a diagonally disposed fixed shaft mounted in the gear box having a gear rotatably mounted thereon in mesh with said worm and drivingly connected with a gear journalled in the bottom wall of the gear box, together with a flexible shaft connection between the latter gear and the drive shaft for the meter mechanism permitting of more or less misalignment between said shaft and gear.

An additional object of the invention is to provide a gear box and a cover plate for the open top of said box attached thereto by suitable screws together with means inaccessible from the exterior of the box for attaching said cover plate to the bottom wall of the meter housing and preventing access to the attaching screws for the cover plate.

It is also the aim and purpose of the present invention to provide a reduction gear box, as above characterized, of simple, durable and inexpensive construction and which may be easily and quickly interchanged for use in connection with the taximeters of different vehicles.

With the above and other objects in view, the invention resides in the improved reduction gear box or unit as will hereinafter be more fully described, illustrated in the accompanying drawings and subsequently incorporated in the subjoined claims.

In the drawing, wherein I have illustrated one simple and practical embodiment of my present improvements and in which similar reference characters designate corresponding parts throughout the several views.

Figure 1 is a top plan view, a part of the bottom wall of the meter housing being broken away and showing the gear box in its attached position;

Figure 2 is a side elevation of the gear box, the bottom wall of the meter housing being shown in section;

Figure 3 is a top plan view, the cover plate of the gear box being removed.

Figure 4 is a transverse sectional view taken substantially on the line 4—4 of Figure 1;

Figure 5 is a vertical sectional view taken substantially on the line 5—5 of Figure 3; and Figure 6 is a longitudinal vertical section taken substantially on the line 6—6 of Figure 3.

Referring in further detail to the drawing, in Figures 1 and 2 thereof I have shown a portion of the bottom wall H of a meter casing or housing to the outer side face of which my improved reduction gear box is attached in the manner which will be later described.

As shown in Figure 3 of the drawing, the body 10 of the gear box is of general rectangular form, and of substantially equal length and width. The corners of the box are preferably rounded and diametrically opposite corners thereof are thickened and reinforced as at 12 and provided with internal flat faces 14 and 16 respectively disposed in parallel transversely inclined planes.

The bottom wall 18 of the box is relatively thick and is formed with a depending tubular boss 20, located in slightly spaced relation from the longitudinal and transverse center lines of the box. The bore 22 of the boss 20 extends through the bottom wall 18 of the box and a bronze bearing bushing 24 is fitted therein.

Within the box a channel or recess 26 of uniform width is formed in the bottom wall 18 and extends diagonally between the flat corner faces 14 and 16. Intermediate the ends of this recess, a deeper and relatively narrow recess 28 is formed in said bottom wall at right angles to the recess 26. One end of the recess 28 and one side of the recess 26 intersects the opening 22 through the bottom wall while the other end of the recess 28 terminates adjacent one side wall of the box.

The reinforced corners 12 of the box have openings 30 and 32 extending therethrough with their axes substantially normal to the corner faces 14 and 16 respectively and intersecting the ends of recess 26 at their lower sides. Each of the reinforced corners 12 is also provided with a tapped vertical bore 34 and a dowel pin receiving bore 36. At one corner of the box, the opening 32 is intersected by a vertical bore 38 having a shallow counterbore 40 at its upper end. Adjacent to the corner face 14, and centrally of the recess 26, the bottom wall 18 of the box is formed with a cylindrical cavity 42 having a bronze bearing bushing 44 press fitted therein.

The reduction gear assembly within the box chamber includes a stationary arbor or shaft having a large diameter end portion 46 terminating at its inner end in the annular shoulder 48 and a relatively long small diameter portion 50. In spaced relation to its end, the latter portion of the shaft is provided with a diametrically extending opening 52 adapted to register with the bore 38 in the wall of the box. Inwardly of the opening 52, a tapered opening of relatively small diameter extends through the shaft portion 50 to receive the securing pin 54 for a spacing collar 56. The large diameter end portion 46 of the shaft in predetermined spaced relation from the shoulder 48 is also provided with a diametrically extending opening 58 of relatively large diameter axially parallel with the opening 52.

In the assembly of the reduction gearing within the box, a worm 60 is first mounted in position, said worm having an axially bored cylindrical shaft extension 62 at its lower end rotatably mounted in the bearing bushing 24. An interchangeable adaptor member 64 is secured in the bore of the shaft 62 by the pin 66 for connection with the flexible drive shaft or cable 23 and the boss 22 is externally threaded to receive a coupling nut 25 for said drive shaft. At its upper end the worm 60 is provided with a short axially projecting stud shaft 68. The cylindrical shaft portion 72 of a miter gear 70 is now mounted for rotation in the bearing bushing 44. This gear is provided with a rectangular axial bore 74.

The collar 56 is now removed from shaft portion 50 and a worm gear 76 having hollow hub extensions 78 and 80 projecting axially in opposite directions therefrom and a miter gear 82 on the hub extension 80 is then arranged in position with said gear 82 in mesh with the miter gear 70 and worm gear 76 positioned directly above the recess 28 and in mesh with the worm 60. The small diameter portion 50 of the shaft is now inserted through the opening 30 in the box wall and the bore of gear 76. Collar 56 is held in position between the gear hub 78 and the internal surface 16 on the box and the shaft passed therethrough and into the opening 32 until the shoulder 48 on the shaft abuts the gear 82 and the large diameter end portion 46 of the shaft is positioned in the opening 30. The opening 52 in the shaft will then be aligned with the vertical opening 38 in the box wall to receive the locking pin 84, the head 86 of which is received in the counterbore 40 and disposed below the upper face of the box wall. Opening 58 in the shaft is thus positioned in substantially coaxial relation with the gear 70. Pin 54 is now inserted to non-rotatably secure the collar 56 to the shaft. By the use of this fixed shaft rotatably supporting the gear 76, the necessity for close manufacturing tolerances in the gear box construction and the use of end bearings to rotatably support the shaft and insure a correct meshing relation of gear 76 with worm 60 is eliminated, thus effecting an appreciable economy in production. In the assembly, a light grade oil is applied to the ends of the shaft and to the intermediate part thereof on which gear 76 is mounted.

A flexible drive transmitting shaft 88 is provided with adapter members 90 and 92 respectively at its opposite ends having square shank portions. The shank portion of the adapter 90 is inserted downwardly through shaft opening 58 and into the square bore 74 of the miter gear 70 mounted in the bottom of the box wall.

After the application of a generous supply of gear lubricant, a sealing gasket 94 is placed upon the upper edges of the box walls, and the cover plate 96 then applied. This plate is provided with a bronze bearing bushing 98 to receive the stud shaft 68 on the upper end of worm 60, said bushing being flush with the upper and lower surfaces of the plate. A second flanged bushing 100 is also mounted in the plate 96 adjacent one end thereof through which the flexible shaft 88 is received in clearance relation to the wall of said bushing. In transversely spaced relation from each side of the bushing 100, the plate 96 is provided with openings 102, and before application of the cover plate, the attaching bolts 104 are inserted upwardly through these openings. Adjacent to the end heads 106 engaging the under side of the plate 96, the bolts 104 are knurled or serrated as at 108 to interlock with the edges of openings 102 and thus securely hold the bolts against rotation.

Plate 96 which substantially corresponds in form or contour to the box body 10 is provided at diagonally opposite corners thereof with the locating dowel pins 110 which are received in the vertical bores 36 to accurately register openings in said plate with the tapped bores 34 receiving the attaching screws 112 for the plate 96, the heads of which are countersunk in the upper surface of said plate.

The bottom wall of the meter housing H is formed with an upstanding boss 114 and a coaxial cylindrical opening 116 extending through said boss and housing wall. A shallow counterbore 118 is provided at the lower end of said opening to receive the flange of the bushing 100. In the upper end of the opening 116, a bronze bearing bushing 120 is fitted.

The gear box assembly is now mounted on the underside of the meter housing wall, the bolts 104 carried by the cover plate 96 being inserted upwardly through openings 121 in said wall which are equidistantly spaced from opposite sides of the boss 114. These openings are slightly arcuate, the bushing 100 establishing only an approximate location of the gear box on the meter housing wall. A short spindle 122 is rotatably mounted in the bearing 120 and provided with a square bore section 124 receiving the upper end of the square shank of adapter member 92. The nuts 126 threaded upon the upper ends of bolts 104 are then tightened to rigidly secure the gear box assembly to the housing wall. Spindle 122 is connected by conventional one-way drive means 128 with the drive shaft 130 for the meter mechanism.

With the use of the flexible drive transmitting shaft 88 and adapters 90 and 92 the close tolerances which are heretofore required in the use of a rigid drive shaft connection between the gear box and the meter are avoided as an exact coaxial relation between the miter gear 70 and drive shaft 130 is unnecessary to insure an uninterrupted transmission of the drive without binding or excessive torsional stress in the drive shaft connection.

It will be noted that the cover plate attaching screws 112 of the gear box are concealed by the wall of the meter housing H while the attaching bolts 104 for the gear box are inaccessible from the exterior of the meter. However, as an additional precautionary measure, to prevent tampering with the gear box, I may provide the end of the cover plate remote from bolts 104 and the corresponding end wall of the body 10 of the box with mating apertured lugs 132 and 134 respectively to receive a headed bolt or screw 136 inserted upwardly through said lugs and threaded into the bottom wall of the meter housing H as shown in Figure 2 of the drawings. The bolt head has a transverse perforation, and a perforated lug 138 projects laterally from the housing wall at the lower end thereof for the connection of said lug and bolt by a conventional wire seal 140 to thereby prevent the undetected removal of the bolt 136.

By limiting the number of close tolerances in the gear box casting, the desired interchangeability of parts is achieved so that the reduction gear ratio may be readily changed, and the same gear box employed in connection with meters of various makes of motor vehicles having relatively different driving gear ratios.

From the above description and the accompanying drawings, it will be seen that I have provided a novel reduction gear box for direct mounting upon the housing of a taximeter or the like which is of minimum dimensions and low production cost, together with a novel mounting and arrangement of the reduction gear assembly therein for connection with the drive shaft of the taximeter. Efficiently functioning operation is thereby insured, notwithstanding axial misalignment between the final reduction gear element and the meter drive shaft. The several parts are also readily interchangeable and the assembly thereof may be easily and quickly made. The invention further provides novel means for quickly locating and securing the gear box in its mounted position on the meter housing and effecting a flexible driving connection between the meter drive shaft and the reduction gear.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a meter housing having an opening in the bottom wall thereof, drive means for meter mechanism within said housing including a gear reduction box having a gear element journalled in the base wall thereof, reduction gearing in said box drivingly connected with said gear element, means mounting said gear box on the external surface of said housing wall with said gear element in approximate coaxial relation to said opening, and means unsupported by the box walls drivingly connecting said gear element with the meter mechanism including a flexible shaft element compensating for axial misalignment between said opening and gear element.

2. A reduction gear assembly comprising a body having a shallow internal chamber of substantially rectangular form, a non-rotatable shaft extending between diagonally opposite corners of said chamber and having an opening therethrough substantially normal to the shaft axis, reduction gearing within said body including a driven gear element journalled on said shaft, and a power transmitting shaft connected to said gear element and extending through said opening.

3. A reduction gear box as defined in claim 2, wherein said drive transmitting shaft embodies a shaft section angularly movable relative to the axis of said opening.

4. A reduction gear box as defined in claim 2, wherein said means comprises a gear journalled in the base of said box body and said drive transmitting shaft is flexibly connected with said gear.

5. A reduction gear box, comprising a box body of substantially rectangular form having an elongated recess in its base wall, a fixed shaft mounted in said body in axially parallel relation with said recess and closely contiguous thereto, and reduction gearing in said box body comprising a driven gear rotatably mounted on said shaft, a second gear drivingly connected with said driven gear journalled in the base wall of the box body immediately below said shaft and within said recess, said shaft having a radial opening therethrough for a drive transmitting connection to said second gear.

6. A reduction gear box as defined in claim 5, wherein said recess and shaft extend between diagonally opposite corners of the box body.

7. A reduction gear box as defined in claim 5, wherein the base wall of the gear box is provided with a second relatively deep recess intersecting said first named recess of right angles thereto to accommodate said driven gear.

8. A reduction gear box as defined in claim 5, wherein the base wall of the gear box is provided with a vertical opening therethrough intersecting one side of said recess, and a drive member for said driven gear journalled in said opening and having means for connection with a flexible drive shaft.

9. A reduction gear box comprising a box body of shallow depth, a non-rotatable shaft mounted in said body in substantially parallel relation to the bottom wall thereof, input and output drive transmitting elements journalled in the bottom wall of said body for rotation about parallel axes substantially normal to the axis of said shaft, said input element being spaced from one side of said shaft and said output element mounted directly below said shaft, reducing gearing rotatably mounted on said shaft and operatively connecting said input element with said output element, and final drive transmitting means unsupported by the box walls and operatively connected with said output element.

10. A reduction gear box as defined in claim 9, wherein said shaft is provided with an opening in coaxial relation with said output element and said final drive transmitting means comprises a shaft element extending through said opening and flexibly connected with said output element.

11. A reduction gear mechanism comprising a shallow box, a shaft mounted in said box and secured in fixed relation thereto with its axis substantially parallel to the bottom of said box, said shaft being provided with a transverse opening, input and output gear elements journalled in the bottom of said box and spaced apart axially of said shaft, intermediate gearing journalled on said shaft and drivingly connecting the input gear element with the outlet gear element, and drive transmitting means coaxially fixed to said output gear element and extending through said opening in said shaft.

ALBERT S. WHEELBARGER.

References Cited in the file of this patent

UNITED STATES PATENTS

| Number | Name | Date |
|---|---|---|
| 764,245 | Lane | July 5, 1904 |
| 768,991 | Hoffman | Aug. 30, 1904 |
| 868,767 | Dunholter | Oct. 22, 1907 |
| 1,074,341 | Avery | Sept. 30, 1913 |
| 1,156,233 | Johanssen et al. | Oct. 12, 1915 |
| 1,319,205 | Carson | Oct. 21, 1919 |
| 2,210,154 | Stevens et al. | Aug. 6, 1940 |
| 2,214,458 | Glamb | Sept. 10, 1940 |
| 2,417,303 | Jordan | Mar. 11, 1947 |